United States Patent [19]

Kupper et al.

[11] Patent Number: 5,169,611

[45] Date of Patent: Dec. 8, 1992

[54] METHOD OF PURIFYING THE EXHAUST GASES FROM PLANTS FOR THE PRODUCTION OF CEMENT CLINKER

[75] Inventors: Detlev Kupper, Telgte; Ludger Brentrop; Wolfgang Rother, both of Oelde; Rainer Schutte, Ennigerloh, all of Fed. Rep. of Germany

[73] Assignee: Krupp Polysius AG, Fed. Rep. of Germany

[21] Appl. No.: 635,992

[22] Filed: Dec. 31, 1990

[30] Foreign Application Priority Data

Jun. 12, 1990 [DE] Fed. Rep. of Germany ....... 4018786

[51] Int. Cl.$^5$ .......................... B01D 47/00; B01J 8/00; C01B 21/00; C01B 17/00
[52] U.S. Cl. ..................................... 423/210; 423/239; 423/244.01
[58] Field of Search ............... 423/244 A, 244 R, 239, 423/239 A, 210

[56] References Cited

U.S. PATENT DOCUMENTS

| | | | |
|---|---|---|---|
| 4,454,100 | 6/1984 | Faatz | 423/210 |
| 4,783,326 | 11/1988 | Srednicki et al. | 423/210 |
| 4,919,905 | 4/1990 | Horaguchi et al. | 423/239 |

Primary Examiner—Gregory A. Heller
Attorney, Agent, or Firm—Learman & McCulloch

[57] ABSTRACT

The invention relates to a method and apparatus for purifying the exhaust gases from plants for the production of cement clinker, in which in a multi-stage filter zone hot exhaust gases coming from a preheating zone are first of all cleaned of dust in a first filter stage and then in a further stage are purified of $NH_x$ compounds, heavy metals and trace pollutants, $SO_2$ and $NO_x$. In order to achieve a particularly efficient and economic purification, the exhaust gases from the preheating zone are set before the first filter stage to such a filter zone inlet temperature that in this first filter stage at least a proportion of the easily volatile pollutant elements and pollutant compounds are precipitated out of the exhaust gases in addition to the dust.

12 Claims, 2 Drawing Sheets

METHOD OF PURIFYING THE EXHAUST GASES FROM PLANTS FOR THE PRODUCTION OF CEMENT CLINKER

The invention relates to a method for purifying the exhaust gases from plants for the production of cement clinker and also to apparatus for the production of cement clinker.

BACKGROUND OF THE INVENTION

In the production of cement clinker the exhaust gases from the final burning zone, which is generally formed by a rotary kiln, frequently contain a greater or lesser proportion of nitrogen oxides ($NO_x$) which are formed partly by reaction of oxygen with the nitrogen in the combustion air and partly by oxidation of the nitrogen compounds in the fuel (cf. German periodical "Zement-Kalk-Gips" 1984, p. 499–507). This $NO_x$ content in the exhaust gases is undesirable because of the emission problems which it causes. Therefore various methods and plants have already been developed in order to reduce this $NO_x$ content in the exhaust gases.

It is known, for example, from "ICS proceedings" 1979, p. 45, FIG. 6, in the precalcination of cement raw material to produce a reducing atmosphere in the precalcination zone outside the rotary kiln by sub-stoichiometric combustion of fuel, and in this case the calcination of the preheated material is carried out in two stages: The first stage is operated with exhaust air from the cooling zone with an oxygen deficiency so that a CO-containing gas mixture from this precalcination zone enters the kiln exhaust gas duct in which a reducing zone is thus created in which a proportion of the $NO_x$ is reduced to nitrogen. In the adjoining part of the kiln exhaust gas duct combustion conditions are created by introducing a further proportion of exhaust air from the cooling zone so that the residual burn-out of the fuel takes place.

DE-OS-35 22 883 also describes a process in which additional fuel is introduced into the kiln exhaust gases outside the rotary kiln before the exhaust gases enter the precalcination zone, the quantity of this additional fuel and the oxygen content of the kiln exhaust gases being such that a sub-stoichiometric combustion in the exhaust gases from the burning zone takes place in the zone before the entry of the exhaust gases into the precalcination zone.

The earlier German Patent Application (P 40 00 795.2) also relates to a process which makes it possible by using very effective and at the same time economic means to produce a marked reduction in the $NO_x$ content of the exhaust gases and at the same time to purify the exhaust gases of troublesome heavy metals and trace pollutants. For this purpose the exhaust gases from the preheating zone are passed through a multi-stage filter zone, where the precipitation of dust contained in the exhaust gases takes place in a first filter stage, whilst in a succeeding further filter stage an adsorbent which is suitable for fixing $NH_x$ compounds, heavy metals, trace pollutants and/or $SO_2$ is provided, and at least a proportion of this adsorbent is removed from the filter stage at specific intervals of time or at a specific charge with pollutants and introduced into the final burning and/or preheating zone. In this case the $NH_x$ compounds are present in the exhaust gases from a clinker burning plant either in the form of aerosols or of gas constituents). The adsorbent (for example carbonaceous material, zeolite or nitrogen-containing material) also serves for adsorption of sulphur dioxide ($SO_2$). In the burning process for producing clinker the $NH_x$ compounds fixed by the adsorbent are again released and make a substantial contribution to the reduction of the $NO_x$ compounds produced in the clinker burning process. Thus in this way a marked reduction in $NO_x$ is already achieved during the clinker burning process and the denitration capacity to be provided in the filter zone is reduced.

The object of the invention is to make further improvements to the method and apparatus particularly with regard to the efficiency and economy of the exhaust gas purification using relatively simple means.

SUMMARY OF THE INVENTION

In the method according to the invention the exhaust gases from the preheating zone are set to such a filter zone inlet temperature before the first filter stage that in this first filter stage easily volatile pollutant elements and pollutant compounds, such as heavy metals and trace pollutants, are precipitated out of the exhaust gases together with the dust, whilst the fixing of residual pollutants and the $NO_x$ reduction are carried out in the further filter stage. This partial or preliminary precipitation (adsorption) of the easily volatile pollutant elements and pollutant compounds in the first filter stage considerably relieves the succeeding further filter stage. This makes it possible to achieve a substantial reduction in size and a marked improvement in the efficiency of the filter zone and thus overall a considerable improvement in the economy of the entire exhaust gas purification system.

In order to prevent pollutants precipitated in the first filter stage—together with the dust—from building up a troublesome circulation, the solids containing dust and precipitated pollutant compounds accumulating in the first filter stage are advantageously removed at least in part from the cement clinker production plant.

If the cement clinker is to be finally ground in a cement grinding zone belonging to the production plant it can be advantageous to deliver a proportion of the solids accumulating in the first filter stage to the cement clinker to be ground in this zone. In this way at least a proportion of the dust precipitated in the first filter stage can be economically utilised without restricting the economic and effective purification of the exhaust gases from the preheating zones of the said pollutants.

In practice, for economic reasons the exhaust gases from the preheating zone are frequently passed via a cooling tower in direct operation or via a raw grinding mill in combined operation and then introduced into the filter zone, as a result of which these exhaust gases already undergo considerable cooling before they reach the filter zone. For the extent of the precipitation of the pollutants according to the invention, that is to say for the precipitation capacity for the said pollutants together with the dust, it is of particular importance that the filter zone inlet temperature is adapted in an optimum manner upon reaching the first filter stage. For this purpose, before being introduced into the first filter stage the exhaust gases from the preheating zone are advantageously cooled to a filter zone inlet temperature of approximately 70° to 150° C., preferably approximately 80° to 130° C. A corresponding monitoring and control arrangement can take care of the setting of the advantageous filter zone inlet temperature. In this case it is advatageous if the filter zone inlet temperature is kept particularly low. The lower this inlet temperature is set the better the precipitation of the said pollutants.

If in combined operation the exhaust gases from the preheating zone are first passed through a raw grinding mill and then into the filter zone, then a filter zone inlet temperature of approximately 90° to 120° C. can already be achieved, which is to be regarded as a particularly favourable temperature range. If this filter zone inlet temperature has not yet been reached, then the exhaust gases can be cooled to the said temperature range by additional supply of cooling gas, particularly fresh air.

If on the other hand in direct operation the exhaust gases from the preheating zone are passed via a cooling tower and then into the first filter stage it will usually be necessary to cool these exhaust gases by additional supply of cooling gas, particularly fresh air, in which case a temperature range for the filter zone inlet temperature of approximately 80° to 130° C. is regarded as particularly advantageous.

In each of these practical modes of operation the aforementioned monitoring and control arrangement can take care of the optimum range for the filter zone inlet temperature, as the exhaust gas temperature before the first filter stage is measured and if necessary can be further lowered by the supply of cooling gas or fresh air. For this purpose at least one cooling gas supply arrangement which is connected for control purposes to the monitoring and control arrangement can advantageously be arranged before the first filter stage.

In this case the quantity of cooling gas to be supplied to the exhaust gases before the first filter stage can be regulated in the appropriate manner by hand or—preferably—automatically, depending upon a measurement value determined before this first filter stage.

In an advantageous embodiment this can also take place in such a way that for regulation of the quantity of cooling gas to be supplied before the first filter stage to the exhaust gases from the preheating zone the gas quality in the region between the first and second filter stage is also determined and processed in an appropriate manner.

Furthermore, it can be more particularly advantageous if, independently of the supply of cooling gas before the first filter stage, between the first and second filter stages fresh air for conditioning the inlet conditions of the exhaust gases into the second filter stage is introduced in a manner adapted to the operational fluctuations of the cement clinker production plant. This second, separate supply of fresh air then serves exclusively for conditioning the inlet conditions for this second filter stage which contains the adsorbent, i.e. the gas temperature and the gas volume are hereby adapted to different operating conditions during final burning or preheating and calcining, and with regard to constant inlet conditions for the exhaust gases which have undergone preliminary purification in the first stage when they enter the second filter stage.

It is also advantageous if at least a proportion of the adsorbent charged with $NH_x$ compounds, heavy metals, trace pollutants and/or $SO_2$ from the second or further filter stage are removed from this filter stage at specific intervals of time or at a specific pollutant charge and introduced into the final burning zone and/or preheating zone. In the further filter stage all suitable materials can be used as adsorbent, particularly carbonaceous material which because of their calorific value also serve as fuel when they are introduced into the clinker burning process or calcining process. Furthermore, when a carbonaceous adsorbent is used hydrocarbons and/or odour-forming gas constituents are at least partially retained by the adsorbent, and these hydrocarbon compounds and/or odour-forming constituents are oxidised when the adsorbent charged therewith is introduced into the clinker burning process.

A zeolite, i.e. an aluminium-containing silicate, can also be used as adsorbent. Nitrogen-containing materials, preferably lime-nitrogen compounds, can also be used advantageously as adsorbent within the framework of the method according to the invention.

When the adsorbent charged with the said pollutants is introduced into the final burning zone and/or preheating zone attention is advantageously paid to the charge of the adsorbent. The quantity of adsorbent charged with $NH_x$ compounds, heavy metals and $SO_2$ introduced into the final burning zone, the calcination zone and/or the preheating zone is advantageously altered depending upon the Cl or $SO_3$ content of the raw material, and this pollutant content of the raw material is preferably measured at the point of intersection between the preheating or precalcination zone and the final burning zone (that is to say in the preheated or precalcined material). The alteration in the quantity of the adsorbent introduced into the clinker burning process can take the form of control or regulation.

The quantity of adsorbent which is removed from the further filter stage which serves for fixing $NH_x$ compounds, heavy metals, trace pollutants and/or $SO_2$, as well as the time at which this removal occurs, are advantageously determined by measuring the concentration of at least one exhaust gas component, preferably after this filter stage. Here too, alterations can be carried out in the form of simple control or automatic regulation. In addition the pressure loss in this filter stage and the charge of the adsorbent with a pollutant constituent can be adduced as a control value.

The purification method according to the invention also permits the far-reaching use of secondary fuels, in which case the emission of pollutants, particularly of halogenated organic compounds such as dioxins and furans, can be reduced by up to two powers of ten by comparison with known methods.

Because of the special operational conditions in the burning of cement clinker (particularly because of the high temperatures and relatively long residence times at these high temperatures), it has already long been the practice to a certain extent to replace a proportion of the fuel normally used for the cement production (such as coal, oil or gas) by so-called secondary fuels. These secondary fuels are for example old tyres, acid sludge, fuller's earth, fuel from refuse, gas from refuse tips, pyrolysis gas, solvent residues, PCB-contaminated used oil, sludge, wood chippings and/or fruit peelings.

In spite of the aforementioned special process conditions in cement production, however, measurements have shown that it is still frequently possible (for example in the case of combustion of used oils containing PCBs) for measurable emissions of dioxins and furans as well as other partially chlorinated compounds to occur. Because of the particular toxicity of these substances and bearing in mind that these compounds are not or are only to a limited extent biodegradable and thus accumulate in the environment, such emissions of pollutants are very hazardous.

In the past, for many secondary fuels it was only the principal firing which came into consideration because of their frequently high thermal stability, since only in this way could the necessary high temperatures of more than 1200° C. and gas residence times of more than 2 s be achieved. However, for combustion engineering reasons it is a regular prerequisite of the use of secondary fuels in the principal firing of a rotary kiln plant that the secondary fuels be pretreated (e.g. crushed or homogenised), which is very costly.

In the application of the purification method according to the invention, secondary fuels which constitute thermally comparatively stable compounds can also be burnt in the precalcination zone (i.e. in the part of the preheating zone which serves for deacidification of the raw material) or in a simple manner in the region of the final burning zone on the material inlet side, i.e. introduced into the inlet of the rotary kiln. Any cracking products resulting from this as well as the gaseous products which are not yet fully oxidised are adsorbed in the filter zone according to the invention which has already been described in detail above.

For the economic operation of the method it is of great importance that the adsorption agents are either suitable for cement production because of their chemical composition or that for example the carbon content of the adsorption agents can contribute a proportion of the thermal energy necessary for the cement production.

The charged adsorbent is withdrawn from the adsorption stage either periodically or continuously and replaced by fresh material. The charged adsorption agent is—in the case where it is a combustible material—preferably introduced into the high temperature zone of the rotary kiln by delivery via the main burner. Even in the case of non-combustible substances it is recommended to return them to the final burning zone, i.e. the rotary kiln, since in this way the adsorbed organic pollutants are subjected a second time to heat treatment and thus degraded as thoroughly as possible.

Apart from organic constituents such as dioxins, furans and other halogenated or non-halogenated hydrocarbons, other pollutants which are environmentally relevant, such as for instance easily vaporisable heavy metal compounds, can be precipitated with the adsorption stage according to the invention. In the case of mercury, thallium or cadmium it is necessary to create an appropriate trough in order to avoid accumulations in circulation systems. This can be achieved by installation of a gas bypass. A second possibility consists of rejecting a proportion of the electrostatic filter dust (dumping on a refuse tip or intergrinding into the cement). In the case of intergrinding into the cement the heavy metals contained in the filter dust are finally fixed in the concrete so as to be environmentally neutral.

THE DRAWINGS

The invention will be explained below with the aid of several embodiments which are illustrated in the drawings, in which.

DETAILED DESCRIPTION

Figure 1:
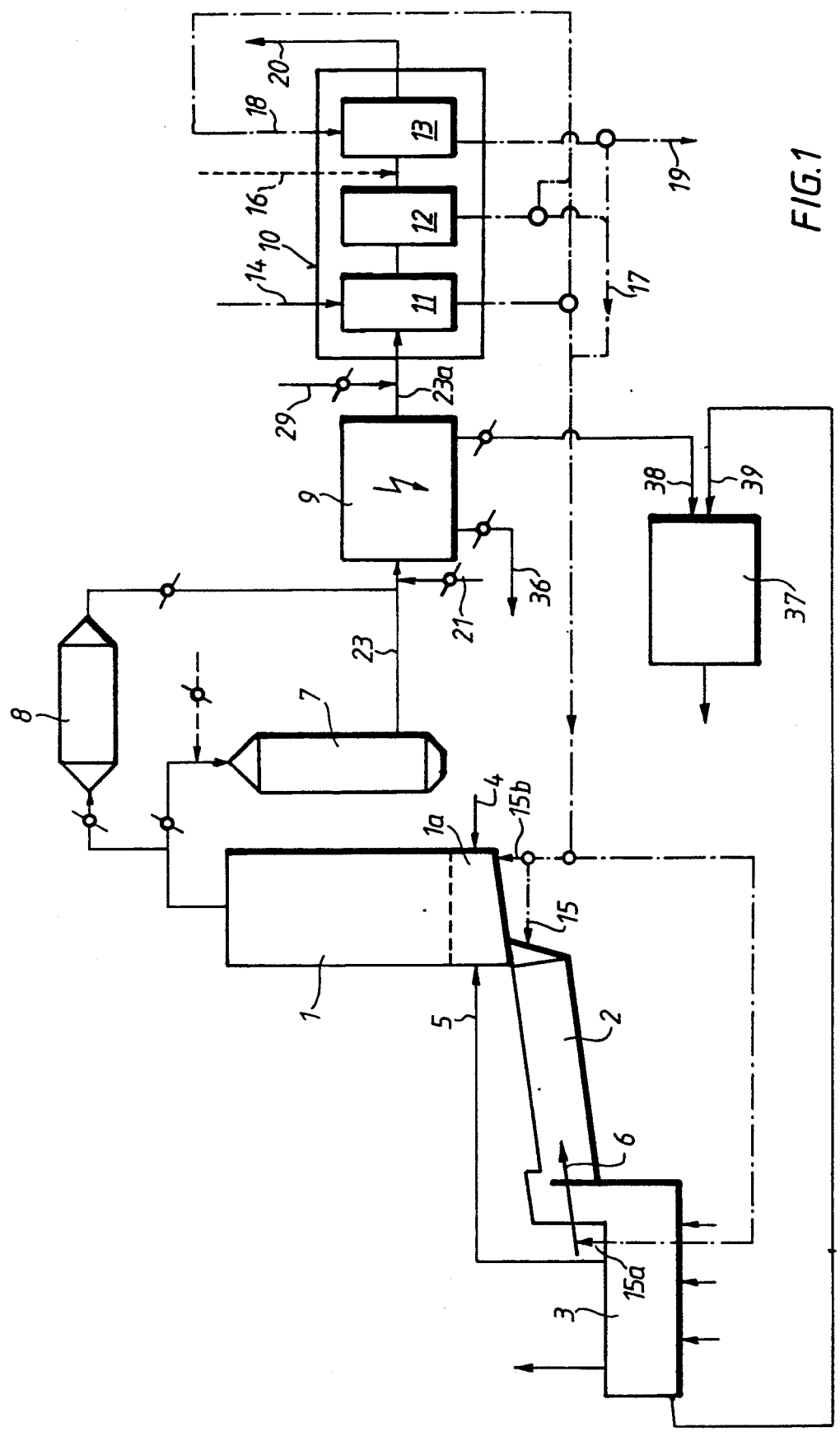
FIG. 1 shows a diagram of a plant according to the invention for the production of cement clinker.

The plant which is intended for the production of cement clinker or for carrying out the method according to the invention is illustrated in FIG. 1. According to this the plant contains a preheater 1 which serves for preheating and at least partial deacidification of the raw material, a final burning kiln in the form of a rotary kiln 2 which serves for final burning of the preheated and deacidified material, as well as a cooler 3 for cooling the finally burnt cement clinker.

In a known manner the preheater 1 can contain in its lower region a precalcination zone 1a which is supplied with additional fuel (arrow 4) and exhaust air (arrow 5) from the cooler 3 for thorough deacidification of the preheated raw material.

The rotary kiln 2 is heated or supplied with fuel (arrow 6) in the usual way from the material discharge side. The exhaust gases from the rotary kiln 2 pass through the preheater 1 and then pass either in direct operation via a cooling tower 7 or in combined operation via a raw grinding mill 8 which serves for drying and grinding the raw material to a multi-stage filter zone which contains at least one first filter 9 as well as a second filter 10 as first and second or further filter stage.

The filter 9 which is used as the first filter stage of the filter zone is generally constructed for removing dust from the exhaust gases from the preheater 1. In the form indicated in the example according to FIG. 1, this first filter is constructed as a conventional electrostatic filter. However, it can also be constructed in a manner which is also generally known as a bag filter or the like.

In the illustrated embodiment (FIG. 1), the second filter 10, which forms the second filter stage of the filter zone, contains three filter chambers 11, 12 and 13 which are constructed as granular bed reactors and the exhaust gases from which dust has been removed pass through these chambers in succession. An adsorbent 14, which after a certain charge with $NH_x$ compounds, heavy metals, trace pollutants and $SO_2$ is at least partially discharged from the first filter chamber 11 and delivered to the material inlet region of the rotary kiln 2 (arrow 15), is delivered at least to the first filter chamber 11, and this will be dealt with later.

Between the second filter chamber 12 and the third filter chamber 13 (which can also contain the said filter medium) ammonia ($NH_3$) can be added (arrow 16) so that in the third filter chamber 13 a reduction in the $NO_x$ compounds still contained in the gas stream takes place by means of the gas containing $NH_3$, the adsorbent in this case having a catalytic action.

As is indicated by further dash-dot lines and arrows, adsorbent discharged not only from the first filter chamber 11 but also possibly from the second filter chamber is passed at least partially to the rotary kiln 2 (according to the arrows 17 and 15). A further proportion of this adsorbent discharged from the filter chambers 11 and 12 can be delivered to the last filter chamber 13 (arrow 18) in order to fix excess or penetrating $NH_3$ here. Adsorbent discharged from this third filter chamber can then either be passed at least partially to the rotary kiln 2 (arrow 17) or taken to a refuse tip or used elsewhere (arrow 19). It should be mentioned in this connection that if required more than three filter chambers can be provided, with a suitable adsorbent contained in each one.

The purified exhaust gases leaving the filter 10 then pass into a chimney (arrow 20).

As has already been mentioned above, depending upon requirements different adsorption agents can be used in each of the individual filter chambers 11, 12 and 13, that is to say for example carbonaceous material, zeolite of nitrogen-containing material.

When carbonaceous material is used as adsorbent, the adsorbent from the second filter 10 which is charged with pollutants does not have to be delivered to the material inlet region of the rotary kiln 2, as indicated by the arrow 15. On the contrary, it can be advantageous for this carbonaceous adsorbent charged with pollutants to be introduced into the clinker burning process because of its calorific value or as a proportion of the necessary fuel. Thus in the embodiment illustrated in FIG. 1, in which the final burning zone or the final burning kiln is formed by a rotary kiln 2 heated from the material discharge side a proportion of the adsorbent removed from the second filter 10 can be delivered to the furnace (arrow 6) of this rotary kiln 2, as indicated by the arrow 15a. Furthermore, in addition to the adsorbent a carbonaceous reduction agent can be introduced into the material inlet region of the final burning zone, for example via a kiln inlet burner. In this way an at least locally reducing atmosphere is created in the said material inlet region of the rotary kiln, as a result of which the $NO_x$-reducing effect of the adsorbent is enhanced.

There is also the possibility of introducing at least a proportion of the adsorbent from the second filter 10 which is charged with pollutants following the arrow 15b into the lower part of the preheater 1 forming the precalcination zone either in addition to the fuel introduced there (arrow 4) or instead of this fuel.

It is particularly important for the way in which this cement clinker production plant is operated that the exhaust gases from the preheater 1 forming the preheating zone are set before the first filter 9 to such a filter inlet temperature that easily volatile pollutant elements and pollutant compounds are precipitated together with the dust out of the exhaust gases in this first filter 9. For this purpose the filter system or the multi-stage filter zone contains a monitoring and control arrangement for setting the exhaust gases from the preheater before the first filter 9 to an inlet temperature between approximately 70° C. and 150° C., preferably between approximately 80° C. and 130° C. In this case at least one cooling gas supply arrangement 21, which is connected for control purposes to the aforementioned monitoring and control arrangement, is provided upstream of first filter 9.

Figure 2:
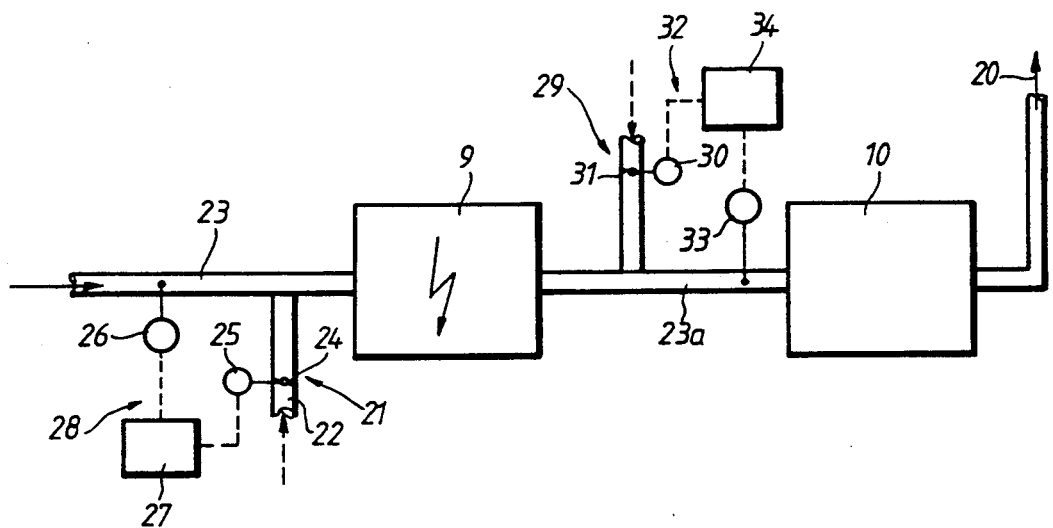
FIGS. 2 and 3 show sections of this plant diagram to explain two variants for exhaust gas regulation in the region of a dust filter or of the first filter stage.

A first embodiment of the construction of the aforementioned monitoring and control arrangement is illustrated schematically in FIG. 2 in the region of the first filter 9 and the second filter 10. In the region upstream of the first filter 9 the cooling gas supply arrangement 21 can be seen; this arrangement contains a duct 22 which is in turn connected to the exhaust gas duct 23 which supplies the exhaust gases to the first filter 9. By means of this duct 22 a suitable cooling gas, for example fresh air, can be introduced into the exhaust gas duct 23 before the first filter 9 in a manner which can be controlled accurately, and for this purpose an adjusting valve 24 which is adjustable between a fully closed position and a fully open position is provided in the cooling gas duct 22.

A temperature gauge 26 is connected to the exhaust gas duct 23—in the flow direction before the connection of the cooling gas duct 22 to the exhaust gas duct 23. This temperature gauge 26 is connected to a control unit 27 which can contain control, computer and regulating elements in a manner which is known per se and is therefore not illustrated in detail, and is connected for control purposes to the actuating drive 25 of the adjusting valve 24.

Independently of the monitoring and control arrangement 28 described above, it can be advantageous if between the first filter 9 and the second filter 10 there is provided a fresh air supply duct 29 which is independent of the cooling gas supply arrangement 21 arranged before the first filter 9 and of the monitoring and control arrangement 28, and which is connected to the exhaust gas duct section 23a between the first filter and the second filter 10 and also contains an adjusting valve 31 which can be adjusted by an actuating drive 30. The supply of fresh air through this fresh air supply duct 29 can be controlled with the aid of an independent control circuit 32 which can also contain a temperature gauge 33 and a control arrangement 34. With the aid of this separate fresh air supply duct 29 the dust-free exhaust gases to be supplied to the second filter can be conditioned in a controlled manner in adaptation to the heat treatment operation in the preheater 1 and/or rotary kiln 2, particularly as regards temperature and volume.

Figure 3:
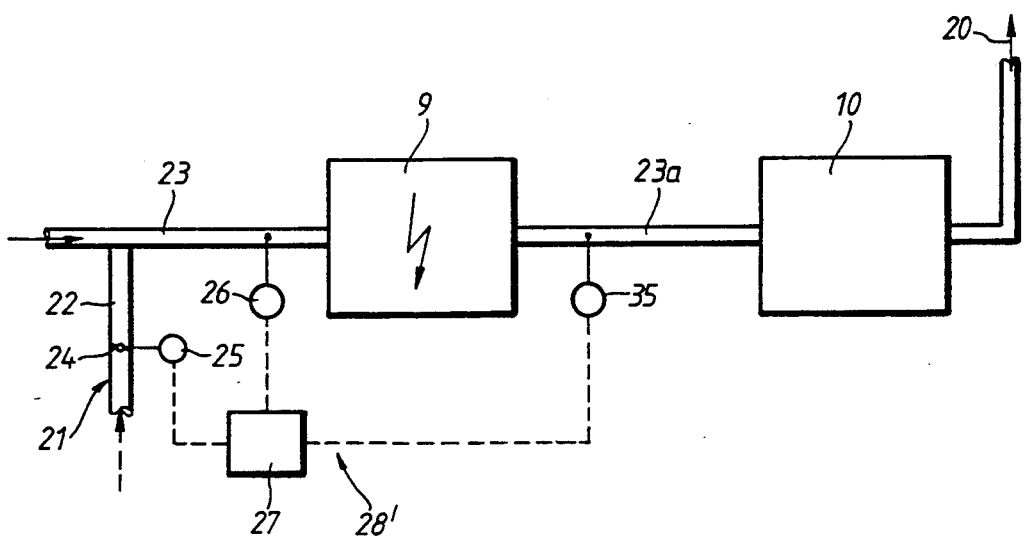

FIG. 3 shows a variant, which is somewhat broader than the example of FIG. 2, of the monitoring and control arrangement for adjusting the preheater arrangement before the first filter 9. This monitoring and control arrangement 28' contains in a similar manner to that of FIG. 2 a temperature gauge 26 which is connected to the exhaust gas duct 23 in the region before the first filter 9 and to the control unit 27. In addition, in this case a similar cooling gas supply arrangement 21 is connected to the exhaust gas duct 23 in the region before the point where the temperature gauge 26 is connected to the exhaust gas duct 23. This cooling gas supply arrangement 21 in turn contains a cooling gas supply duct 22 with an adjusting valve 24 arranged in it which can be adjusted within its adjustment range by an actuating drive 25 which is also connected for control purposes to the control unit 27.

Furthermore, an additional measuring arrangement 35, by means of which the quality of the dust-free exhaust gas is determined and which is in turn also connected for control purposes to the monitoring and control arrangement 28' (all control connections are indicated in broken lines), is arranged in the exhaust gas duct section 23a behind the first filter 9. With this type of regulation or control of the filter zone inlet temperature for the exhaust gases it is also possible to determine a special characteristic value which represents the exhaust gas quality at that time behind the first filter 9 and which can be influenced by the higher-order temperature control (over the monitoring and control arrangement 27) by corresponding supply of fresh air. Thus the inlet conditions of the second filter 10 can also be influenced by this additional regulation of the gas quality.

The regulation of the filter zone inlet temperature (before the first filter 9) can also be controlled by supplying cooling gas or fresh air before the cooling tower 7 or before or in the raw grinding mill 8. Cooling of the exhaust gases from the preheater in a cooling tower (which is usually achieved with cooling water) is generally insufficient for setting the suitable filter zone inlet temperature before the first filter 9; therefore the regulated fresh air cooling described above is usually necessary before this first filter 9.

In the method according to the invention a considerable proportion of the easily volatile pollutant elements and pollutant compounds, such as heavy metals and trace pollutants, contained in the exhaust gases are also precipitated at the same time as the dust contained in the exhaust gases. Thus this preliminary precipitation of a significant proportion of the pollutants relieves the second filter stage (filter 10) to a considerable extent, so that this second filter stage can operate more efficiently or can be of smaller construction than in the known plants.

The solids (filter dust and pollutants precipitated with it) precipitated out of the first filter 9 can be removed at least in part from the clinker production plant, as is indicated in FIG. 1 by the arrow 36. In addition, at least a proportion of these solids precipitated in the first filter 9 are used for the production of cement from the burnt and cooled clinker. In this case it may be assumed that, after cooling, the cement clinker is finally ground in the usual way in a cement grinding zone containing a so-called finishing mill 37. Then at least a proportion of these solids collected in the first filter 9 can be introduced into this finishing mill 37, together with the cement clinker 3 (arrow 39) or from intermediate silos) which is to be finally ground here.

We claim:

1. A method of purifying the exhaust gases containing dust, volatile pollutants including heavy metals, $SO_2$, $NO_x$, and residual pollutants resulting from the production of cement clinker, in which raw material is preheated and at least partially deacidified in a preheating zone with hot exhaust gases from a final burning zone in which the preheated material is burnt to produce cement clinker, and in which exhaust gases from the preheating zone are purified in a multi-stage filter zone, said method including the steps of cooling the exhaust gases from the preheating zone to a temperature sufficient to cause volatile pollutants in such exhaust gases to precipitate; passing the cooled exhaust gases through a first stage of the multi-stage filtering zone where precipitated volatile pollutants and dust are filtered from the exhaust gases; and passing the filtered exhaust gases through at least one subsequent filtering stage containing an adsorption agent capable of fixing residual pollutants, $SO_2$, and reducing $NO_x$ present in the exhaust gases.

2. The method according to claim 1 including at least partially removing from said filtering zone filtrates accumulated in the first filter stage.

3. The method according to claim 2 including grinding the clinker in a grinding zone and adding a proportion of the filtrates to the clinker for grinding therewith.

4. The method according to claim 1 including cooling the exhaust gases upstream from the first filter stage to a temperature of between 70° and 150° C.

5. The method according to claim 4 including cooling the exhaust gases discharged from the preheating zone.

6. The method according to claim 5 including monitoring the temperature of the exhaust gases supplied to the first filter stage and regulating the cooling thereof to maintain a selected temperature range.

7. The method according to claim 4 including adding fresh air to the exhaust gases upstream from the first filter stage.

8. The method according to claim 7 including monitoring the temperature of the exhaust gases supplied to the first filter stage and adjusting the amount of fresh air added to said exhaust gases to maintain the temperature thereof within a selected range.

9. The method according to claim 1 including periodically removing at least a portion of contaminated adsorbent from the subsequent filter stage and introducing said portion of said contaminated adsorbent into a selected one of the final burning and preheating zones.

10. The method according to claim 1 including combusting fuel in at least one of the preheating and final burning zones.

11. The method according to claim 1 including discharging exhaust gases from the subsequent filtering stage to avoid accumulations of heavy metal volatile pollutants.

12. The method according to claim 1 including withdrawing a portion of the filtrate from the first filter stage to avoid accumulations therein of heavy metal volatile pollutants.

* * * * *